(12) United States Patent
Jin et al.

(10) Patent No.: US 11,275,671 B2
(45) Date of Patent: Mar. 15, 2022

(54) SYSTEMS, METHODS AND MEDIA FOR DYNAMICALLY SHAPED TENSORS USING LIQUID TYPES

(71) Applicants: Ende Jin, Unionville (CA); Kai-Ting Amy Wang, Toronto (CA)

(72) Inventors: Ende Jin, Unionville (CA); Kai-Ting Amy Wang, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/939,771

(22) Filed: Jul. 27, 2020

(65) Prior Publication Data

US 2022/0027255 A1    Jan. 27, 2022

(51) Int. Cl.
| | |
|---|---|
| *G06F 9/44* | (2018.01) |
| *G06F 11/36* | (2006.01) |
| *G06F 8/41* | (2018.01) |
| *G06N 20/00* | (2019.01) |
| *G06N 5/04* | (2006.01) |
| *G06F 8/30* | (2018.01) |

(52) U.S. Cl.
CPC .......... *G06F 11/3604* (2013.01); *G06F 8/437* (2013.01); *G06F 11/3612* (2013.01); *G06N 5/04* (2013.01); *G06N 20/00* (2019.01); *G06F 8/311* (2013.01)

(58) Field of Classification Search
None
See application file for complete search history.

(56) References Cited

U.S. PATENT DOCUMENTS

| | | | | |
|---|---|---|---|---|
| 6,842,786 | B1* | 1/2005 | Webb | H04L 29/06 709/201 |
| 7,707,566 | B2* | 4/2010 | Grover | G06F 8/437 717/148 |
| 9,727,446 | B2* | 8/2017 | Campbell | G06F 11/3672 |
| 2015/0067658 | A1* | 3/2015 | Hahnenberg | G06F 8/4443 717/148 |
| 2019/0205756 | A1 | 7/2019 | Temam et al. | |
| 2020/0379740 | A1* | 12/2020 | Paek | G06F 8/447 |

FOREIGN PATENT DOCUMENTS

| | | |
|---|---|---|
| CN | 110263913 A | 9/2019 |
| CN | 110941789 A | 3/2020 |
| EP | 3588282 A2 | 1/2020 |

(Continued)

OTHER PUBLICATIONS

Seo, Minjoon, et al. "Bidirectional attention flow for machine comprehension." arXiv preprint arXiv:1611.01603 2016.

(Continued)

*Primary Examiner* — Qamrun Nahar

(57) ABSTRACT

Systems, methods, and processor readable media are described for verifying software. A liquid type system is used by a programming language to allow source code to define tensor variables with dimensionality and/or shape dynamically defined at runtime. The dimensionality and shape of a tensor variable invoked in the source code, as well as the data type of the constituent elements of such a tensor variable, may be defined by a static type that may be verified at compile time.

10 Claims, 11 Drawing Sheets

(56) References Cited

FOREIGN PATENT DOCUMENTS

WO    2018136697 A1    7/2018

OTHER PUBLICATIONS

Rondon, Patrick M., Ming Kawaguci, and Ranjit Jhala. "Liquid types." Proceedings of the 29th ACM SIGPLAN Conference on Programming Language Design and Implementation. 2008.
Vazou, Niki. Liquid Haskell: Haskell as a theorem prover. Diss. UC San Diego 2016.
Flanagan, Cormac. "Hybrid type checking." Conference record of the 33rd ACM SIGPLAN-SIGACT symposium on Principles of programming languages 2006.
Vazou, Niki, et al. "Refinement reflection: complete verification with SMT." Proceedings of the ACM on Programming Languages 2. POPL 2017.

\* cited by examiner matmul: m:N, n:N, p:N, q:N, Tensor [m, n, T], {Tensor [p, q]| p=n, T}→Tensor [m, q, T]

FIG. 5A

```
def sampleFunction (a: int, b: int) :
    t = alloc (a, b)
    k = matmul (t, t)    502(1)
    return k
```

FIG. 5B

$$\begin{bmatrix} 5 & 5 & 5 \\ 5 & 5 & 5 \end{bmatrix}$$

FIG. 5C

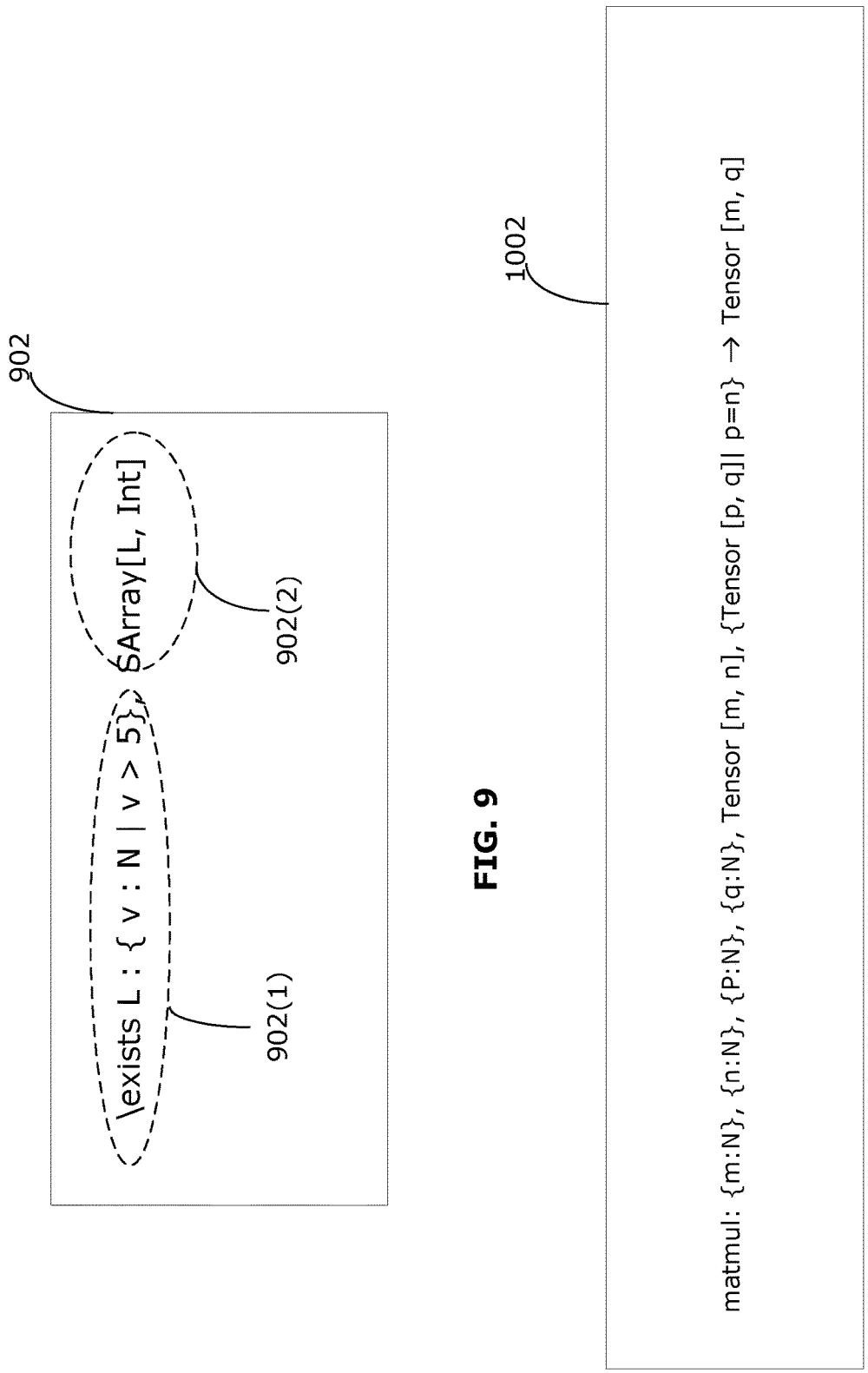

```
def sum (x):
if x< 0:
    ret = 0
else:
    ret =x + sum (x-1)
    assert (ret == (x*(x-1))/2)
return ret
```

FIG. 11

SYSTEMS, METHODS AND MEDIA FOR DYNAMICALLY SHAPED TENSORS USING LIQUID TYPES

TECHNICAL FIELD

The present application relates to software source code verification and compilation, and in particular to systems, methods and media for representing dynamically-shaped tensors using a liquid type system.

BACKGROUND

Machine learning DSLs (domain specific languages) are specialized computer programming languages used for developing machine learning-based software systems. A variable defined by a programming language typically has a fixed data type, typically indicating a set of fixed characteristics of a variable of a given type. As used herein, "type" and "data type" shall both refer to a data type defined by a programming language. Examples of common data types include integers, floating point numbers, and arrays.

Machine learning algorithms tend to make extensive use of tensors, i.e. multi-dimensional matrices of values, which may represent structures such as convolution kernels and activation maps in the context of machine learning. As used herein, the term "tensor" may refer to a multi-dimensional array of values, including an array of arrays.

Software verification refers to a process whereby software source code is automatically checked for compliance with standards imposed by the programming language, such as type safety. Verification may be carried out by a compiler or other software tool. (As used herein, "verification" shall refer to software verification.) When a variable is invoked for a specific purpose in the source code, such as by being passed as a parameter to a function, the compiler may verify that the variable being invoked is defined in the source code as being of a correct type for use as the given parameter by the given function. If the type of the variable is incorrect, the source code is deemed to be invalid by the compiler, and the compiler may refuse to compile the code and/or alert the user to the presence of a compilation or verification error.

In existing programming languages used for machine learning, including machine learning DSLs, tensors may be represented by variables of an existing fixed type, such as an array with a defined number of dimensions, or by dynamic data types defined within the source code, e.g. by a software library, based on existing fixed data types (e.g., arrays of arrays with dimensionality defined by various parameters passed to functions defined by the library). In either case, a compiler performing software verification may only verify the type safety of tensors at the level of the fixed, static data types (e.g. array) defined by the programming language. A software library defining a dynamic data type must include functions for checking type safety, e.g., to verify that the dimensionality of a tensor passed as a parameter to a function matches the required dimensionality for that parameter. This not only adds to the complexity of the source code used to define and use tensors, but it also adds additional computation at runtime as opposed to compile time, slowing the execution of the compiled source code.

Thus, the dimensionality (i.e., how many dimensions the tensor has) and/or shape of a tensor (i.e., the size of the tensor in each dimension) may be defined or verified in the source code by calling functions defined by a software library. However, in some cases, the dimensionality and/or shape of the tensor must be defined in the source code itself, instead of allowing the compiled program to dynamically define these aspects of the tensor at runtime based on data inputs. Especially in the context of Natural Language Processing (NLP), many software applications require allocations and operations on tensors having dimensionalities or shapes that are unknown at compile time, but are fixed at runtime.

In the context of machine learning software, such as in natural language processing model, an inference model trained using machine learning takes a tensor as an input. As the shape and/or other properties of the tensor may be dynamic and unknown, it may be a challenge to represent the tensor while programming the natural language processing model, which can lead to inaccurate output. Furthermore, when checking the validity of the output, a plurality of manual checking functions must be added to the source code to ensure the validity of the output.

For example, the input length of a BiDAF (Bidirectional Attention Flow) tensor used in natural language processing may not be known until runtime. The BiDAF length determines a fixed parameter among multiple layers in an NLP model. Using existing techniques, a software developer will have to either waste time on trivial bugs caused by accidental misuse of the BiDAF tensor, or manually add checks and shape calculation throughout the source code, potentially resulting in code smell and sacrificing optimization opportunities that could result from exposing of tensor size information to the compiler.

To address these issues of coding complexity, computational efficiency, and flexibility it may therefore be advantageous to provide programming languages, compilers, and verification techniques that define a static type (i.e., a data type defined at the level of the programming language) for tensors of a shape and/or dimensionality that can be dynamically defined at runtime or that otherwise overcome one or more of the aforementioned disadvantages of the prior art.

SUMMARY

The present disclosure provides systems, methods, and processor readable media for verifying software. In some embodiments, a liquid type system may be used by a programming language to allow source code to define tensor variables with dimensionality and/or shape defined at runtime. In some embodiments, the dimensionality and shape of a tensor variable invoked in the source code, as well as the data type of the constituent elements of such a tensor variable, may be defined by a static type that may be verified at compile time.

Functional programming languages may be used to verify the validity of program source code, which can help to improve programmer productivity and software reliability. For example, a liquid type system, also called a logically qualified data type system, is a programming language which has been applied to infer dependent types (i.e. types whose definition depends on a value, such as an array type defined by a length parameter) precisely enough to prove a variety of validity properties. A liquid type system provides a means to specify and automatically verify semantic properties of the source code. A liquid type system may define constraints on dependent types where the source code is decidable, which provides automatic verification of source code with low requirements for type annotation.

A liquid type system may provides benefits for dependent types, such as static verification of critical properties and the elimination of expensive run-time checks with minimal manual annotation.

In some aspects, the present disclosure describes a method for verifying source code of a computer program written in a programming language. The method comprises receiving the source code, identifying a reference to a tensor variable in the source code, and compiling the source code to generate a constraint. The constraint specifies that the tensor variable is represented by a first sized array of a sized array data type. The sized array data type is defined by the programming language such that a sized array of the sized array data type comprises one or more array elements, an associated type parameter that specifies a type for the array elements, and an associated size parameter that specifies a size of the sized array. The type parameter is selected from of a plurality of types, the plurality of types including the sized array data type. The size corresponds to the number of array elements. The method further comprises generating one or more constraint solutions based on the constraint to verify the source code.

In some examples, the method further comprises identifying a call to a primitive function in the source code, and identifying the tensor variable invoked as a parameter of the primitive function in the source code. The tensor variable is specified by the source code to include a shape parameter that specifies a plurality of dimensional sizes of the tensor variable, a plurality of components, and a type parameter that specifies a type for the components. The number of components corresponds to the product of the dimensional sizes. The size of the first sized array corresponds to one of the dimensional sizes of the tensor variable. The associated type parameter of the first sized array is a sized array type. The array elements of the first sized array are a first recursively nested set of sized arrays, such that the size of the first sized array and the sizes of each recursively nested set of sized arrays within the first sized array collectively correspond to the dimensional sizes of the tensor variable. The constraint further specifies that the first sized array is input to the primitive function to invoke the primitive function.

In some examples, the constraint includes one or more well-formedness judgement statements. Generating the constraint further comprises defining a plurality of well-formedness judgement constraints that state a type of the first sized array. Generating the constraint further comprises generating well-formedness judgement statements based on the plurality of defined well-formedness judgement constraints until an associated type parameter of a recursively nested sized array of the first sized array corresponds to the type parameter of the tensor variable.

In some examples, the constraint includes one or more subtyping judgement statements. Generating the constraint for the input tensor further comprises defining a plurality of subtype judgement constraints that state a type of the first sized array. The type of the first sized array is a subtype of a predefined sized array format. The predefined sized array format comprises a sized array having a predefined type parameter value and a predefined size parameter value for itself and each of its recursively nested sized arrays. Generating the constraint for the input tensor further comprises generating the subtyping judgements based on the plurality of defined subtype judgement constraints until an associated type parameter of a recursively nested sized array of the first sized array corresponds to the type parameter of the tensor variable.

In some examples, the programming language defines a dependent pair type. A dependent pair of the dependent pair type comprises a first component having a value, and a second component having a type, the type being based on the value of the first component, and the value of the shape parameter of the tensor variable is defined by a second component type of a dependent pair.

In some examples, the method further comprises registering the primitive function and the tensor variable by representing the dimensional sizes of the tensor variable as implicit parameters.

In some examples, the method further comprises, in response to determining that the source code is uncertain as a result of verification, modifying the source code by inserting an assertion function into the source code to automatically verify the modified source code during runtime.

In some examples, generating constraint solutions further comprises using a satisfiability modulo theories (SMT) solver to infer a valid typing for the source code, determining whether the generated constraint satisfies the inferred valid typing.

In some examples, the method further comprises outputting a result with respect to a verified validity of the program source code.

In some aspects, the present disclosure describes a computer-readable medium having instructions tangibly stored thereon, wherein the instructions, when executed by a processing unit, causes the processing unit to perform the method steps above.

BRIEF DESCRIPTION OF THE DRAWINGS

Reference will now be made, by way of example, to the accompanying figures which show example embodiments of the present application, and in which:

FIG. 5A shows an example of registering a type declaration of a primitive function matmul using the method of FIG. 4.

FIG. 5B shows an example of source code of a computer program containing a call to the primitive function matmul, which may be verified and compiled by the method of FIG. 4.

FIG. 5C shows an example tensor variable represented using the method of FIG. 4.

FIG. 9 illustrates an example of a dependent pair used to define a type of a sized array according to an example embodiment.

FIG. 10 illustrates an alternative example of registering a primitive function of the source code of FIG. 5B.

FIG. 11 illustrates an example of modifying the source code of FIG. 5B according to an example embodiment.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure provides systems, methods, and processor readable media for verifying software. In some embodiments, a liquid type system may be used by a programming language to allow source code to define tensor variables with dimensionality and/or shape defined at runtime. In some embodiments, the dimensionality and shape of a tensor variable invoked in the source code, as well as the data type of the constituent elements of such a tensor variable, may be defined by a static type that may be verified at compile time.

To support dynamic shape relations at the type system level, a type system must allow a developer to write a function wherein the return type of the function and the shape of the return type will dynamically vary according to the value of an input. The input will typically be of a fixed type (such as integer type, herein abbreviated to int). A static type system should preferably achieve a good balance between expressiveness and accessibility without sacrificing safety.

Figure 1:
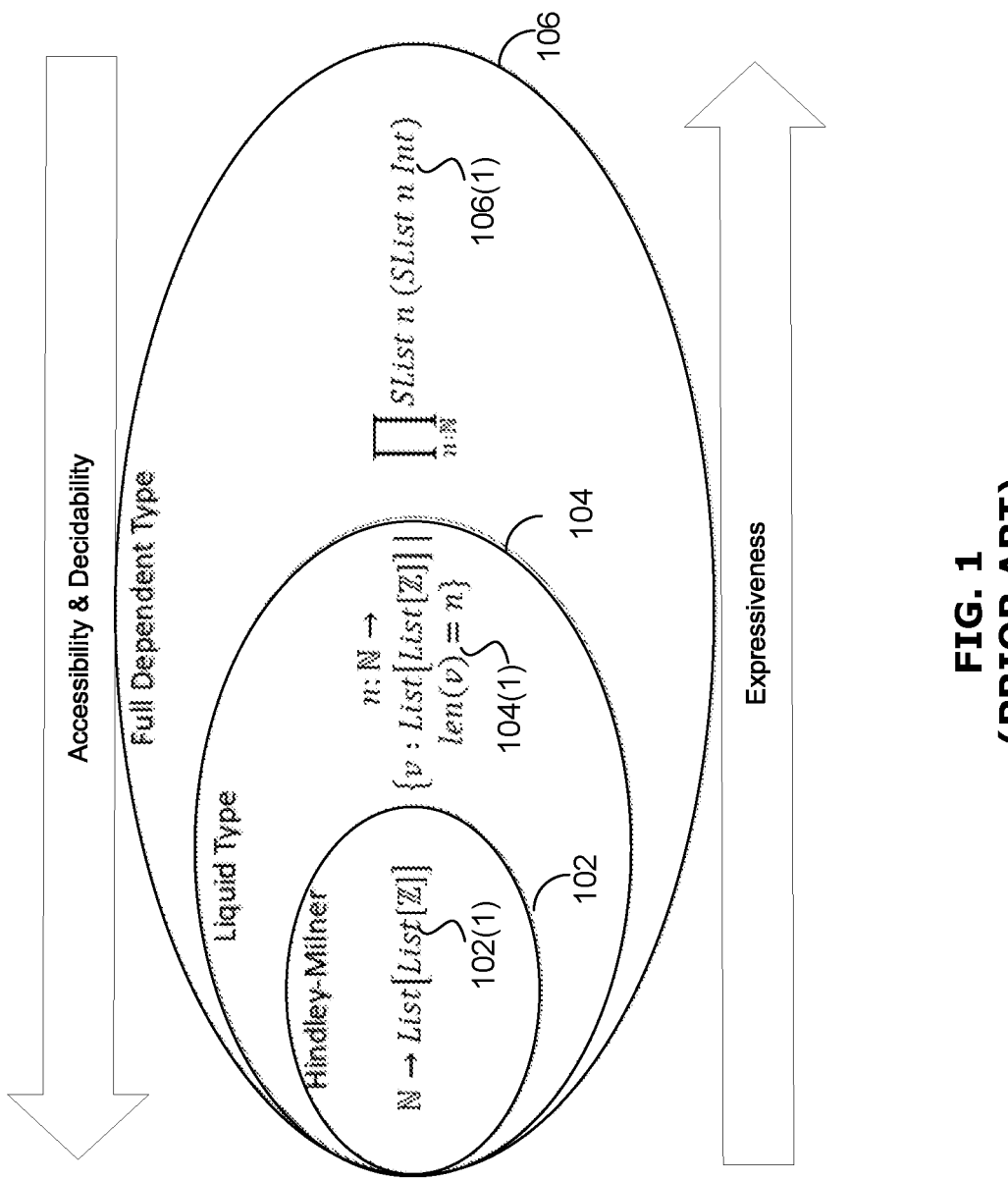
FIG. 1 (prior art) is an high-level comparison of three broadly-defined type systems used for verifying source code, showing how each type system would represent type annotation for a function allocating a two-dimensional tensor with a size defined by an input.

FIG. 1 (prior art) shows three verification systems, which may be used to detect errors in the source code of a program at compile time. The three type systems are, in order of increasing expressiveness and decreasing accessibility and decidability, a Hindley-Milner (HM) type system 102, a liquid type system 104, and a full dependent type system 106. Each type system is shown with an example type annotation 102(1), 104(1), 106(1) within the given type system 102, 104, 106 for a function allocating a two-dimensional tensor with a size defined by an input.

A Hindley-Milner (HM) type system 102 is a type system for lambda calculus with parametric polymorphism. The HM type system 102 has a type constraint with a format as denoted by statement 102(1), which does not express the shape information of variables at the type level. Therefore, it is challenging for the HM type system 102 to detect errors in the program stemming from a shape mismatch.

A full dependent type system 106 is a type system using dependent types to express all shape information in detail. Expression 106(1) shows that every single aspect of shape information is defined for a variable, losing most of the advantages of type inference and requiring extensive type annotation, make it less accessible.

A liquid type system 104 is a refinement type system wherein logical predicates and values are specified with semantic properties. A type constraint of the liquid type system may include a statement 104(1) wherein a logical predicate (e.g., len(v)=n) is used. A conventional liquid type system 104 has a balanced trade-off between expressiveness, accessibility, and decidability, but is unable to precisely perform type-checking and type inference when tensors with multiple different sets of shape information are invoked in the source code.

Among the three different type systems of FIG. 1, the liquid type system 104 may be used as the starting point for embodiments described herein, as it may provide an advantageous balance among the different factors discussed above.

A Tensor type may be provided by the type system as an intrinsic type. This may make type checking easier and provide the compiler with more information about the shapes of the tensors in order to assist with optimization.

A type and shape annotation mechanism may also be added to the type system to let a software developer express complex shape relations that the liquid type system 104 itself fails to infer. The type system may also add a fall-back strategy that is activated when the liquid type system 104 fails to check the correctness of the annotated symbolic relations of the shape. The fall-back strategy may also be chosen to achieve a balance between expressiveness and accessibility.

Thus, dynamic shape relations may be supported at the type system level in example embodiments in one or more of three ways: by providing a type system permitting functions wherein the return type of the function and the shape of the return type will dynamically vary according to the value of an input; by providing a Tensor type as an intrinsic type; and by providing a type and shape annotation mechanism that can express complex shape relations that the liquid type system fails to infer, potentially including one or more fall-back strategies for when the liquid type system fails.

In some embodiments, the disclosure may provide a liquid type system 104 suitable for Machine Learning DSLs. By introducing the concept of dependent functions, a liquid type system 104 may demonstrate expressiveness at the type system level: it can express functions returning different types and shapes when given arguments of the same type. By imposing constraints on the type system constraints, a liquid type system 104 may maintain a high level of decidability with respect to type checking and type inference while remaining relatively easy to use. By finding correspondence between liquid types and logical statement, a liquid type system 104 can utilize a satisfiability modulo theories (SMT) solver to speed up its inference, make it practical for industrial use and checking more invariants about the behavior of the program than just shape invariants.

In some embodiments, the disclosure may provide a liquid type system 104 supplemented by a "sized array" data type—a type wherein the length of the array is part of its type. In some embodiments, the disclosure may provide a liquid type system 104 supplemented by a "dependent pair" concept—a pair type wherein the type of the second element can vary according to the value of the first element.

A sized array type is a powerful concept due to its simplicity and conciseness, and it is easy to use a sized array type to implement a model for representing multidimensional tensors at the type system level. In addition, by using the sized array type as the basic building block for tensors instead of directly introducing a tensor type, a tensor of tensors is definitionally equivalent to a tensor, resulting in an elegant representation of arbitrary tensors at the type system level.

The dependent pair concept expands the expressiveness of shape information and computation in the type system. Dependent pairs may allow developers to write source code returning a tensor with a completely dynamic shape. Source code can be written that directly returns a dependent pair, wherein the array (as a second element of the dependent pair) can have shape information defined by the data of the first element of the dependent pair.

Some embodiments may use shape annotation. Some such embodiments may also require one or more fall-back strategies as described above. In some embodiments, two fall-back strategies may be employed: first, moving undecided shape checking into runtime, and second, allowing developers to manually write proofs for shape relations that the liquid type system 104 fails to prove at compile time. The first approach relies on the SMT solver's ability to precisely categorize the shape constraints into three groups: right, wrong and uncertain. Uncertain shape constraints are transformed into dynamic runtime assertions, which may be helpful for providing debug information. The second approach relies on the SMT solver's ability to express equational proofs. SMT only supports syntactical reasoning; therefore, some embodiments may provide an easy-to-use interface for a developer to connect each step of a proof.

An example use case will now be described for a modified liquid type system as described above. The modified liquid type system may use an existing HM type system 102 as a baseline and add certain operations implementing the various liquid type features described above. The example use case illustrates a part of the data pipeline for verification of a program, such as an NLP model programmed using machine learning techniques, using an HM type system 102 in FIG. 2. A modified version incorporating the liquid type system features described above is shown in FIG. 3.

Figure 2:
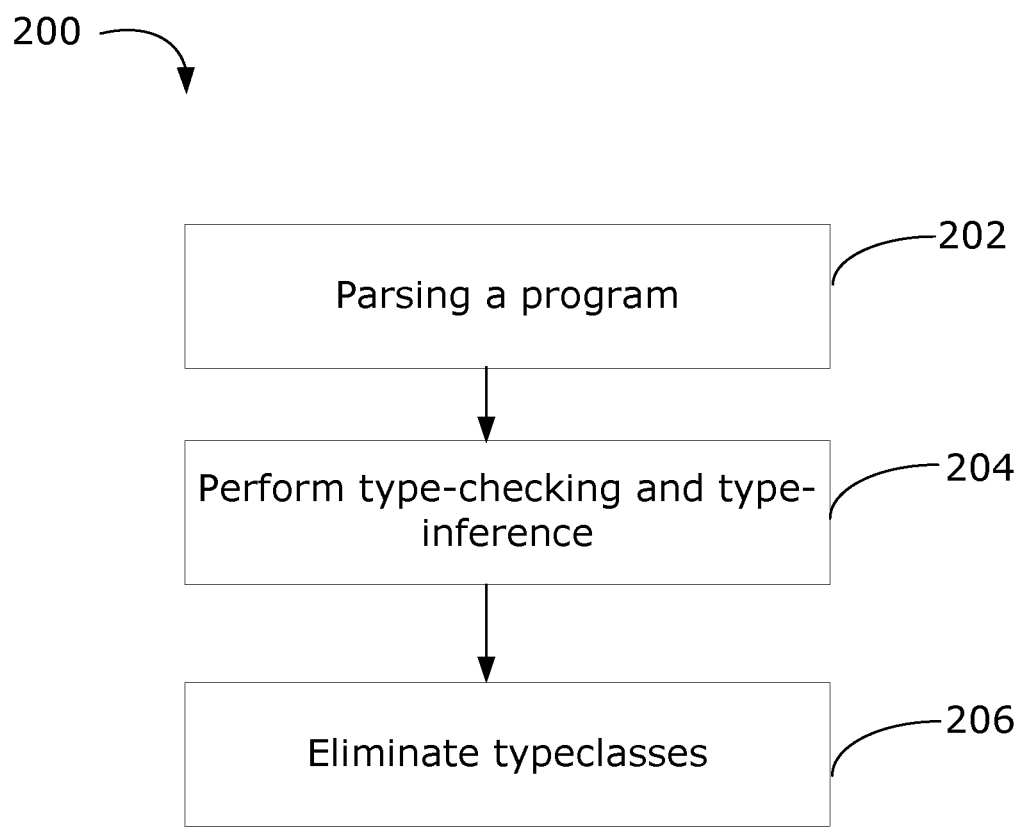
FIG. 2 (prior art) illustrates a flowchart of a method for verifying source code.

FIG. 2 (prior art) is a flowchart illustrating a conventional method for performing verification of a program, implemented by a HM type system 102, such as a compiler.

At 202, source code for the program is parsed by the HM system 102.

At 204, type-checking and type inference are performed with respect to the source code. These processes make use of known HM type system 102 techniques for type checking and type inference.

At 206, typeclasses are eliminated. In cases wherein a given type is defined to be an instance of a given class in two different ways (e.g., two typeclasses), it may be difficult to decide whether the two given typeclasses overlap. Therefore, the HM type system 102 explicitly adds and removes one of the two given typeclasses to verify whether the two given typeclasses overlap.

Figure 3:
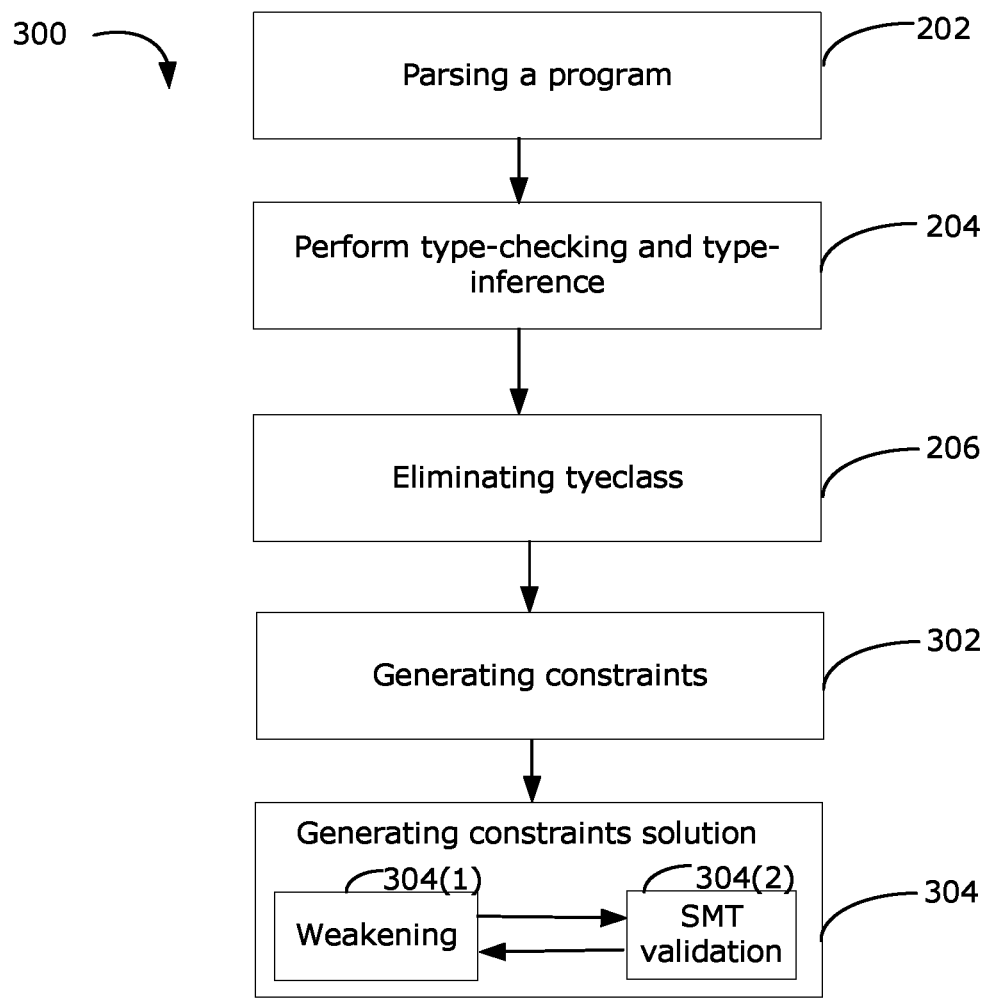
FIG. 3 illustrates a flowchart of a modified version of the method of FIG. 2, utilizing a modified liquid type system according to an example embodiment.

FIG. 3 is a flowchart illustrating a method to perform verification of a program using a modified liquid type system as described above. In the modified liquid type system, tensors are invoked as variables. The method 300 includes steps 202-210 as discussed in the example of FIG. 2, and further includes steps 302 and 304, which may enable the type-checking of the program to be performed with greater accuracy.

At 302, constraints are generated. This step may be implemented by a constraint generator. The constraint generator may first go through an intermediate representation (IR) tree that is generated in the compiler internally to represent the source code of the program. Each IR node of the IR tree is associated with a type. The constraint generator generates a template for each type. For example, with respect to function types for each function call, the constraint generator produces a dependent function type for each function call. With respect to tensors, templates for tensors' types are generated with reference to FIGS. 6A-6B and 7A-7B, which will be discussed in detail below. The judgement constraints containing templates are also called "well-formedness judgement constraints" and "subtyping judgement constraints" in the examples of FIGS. 6A-6B and 7A-7B. Once the templates for function calls and tensors are generated, well-formedness judgement statements and subtyping judgement statements are generated, such as constraints 802 in the example of FIG. 8.

At 304, constraint solutions are generated. In some examples, each generated well-formed judgement statement for a dependent function is split into simple judgement statements for each base type. Interactive weakening may be performed at step 304(1). A satisfiability modulo theories (SMT) solver may be then be used to check the validity of the source code at step 304(2). The SMT solver may infer a valid typing for the source code, and determine whether the generated constraint satisfies the inferred valid typing. Steps 304(1) and 304(2) may be iterated in alternating sequence one or more times.

Figure 4:
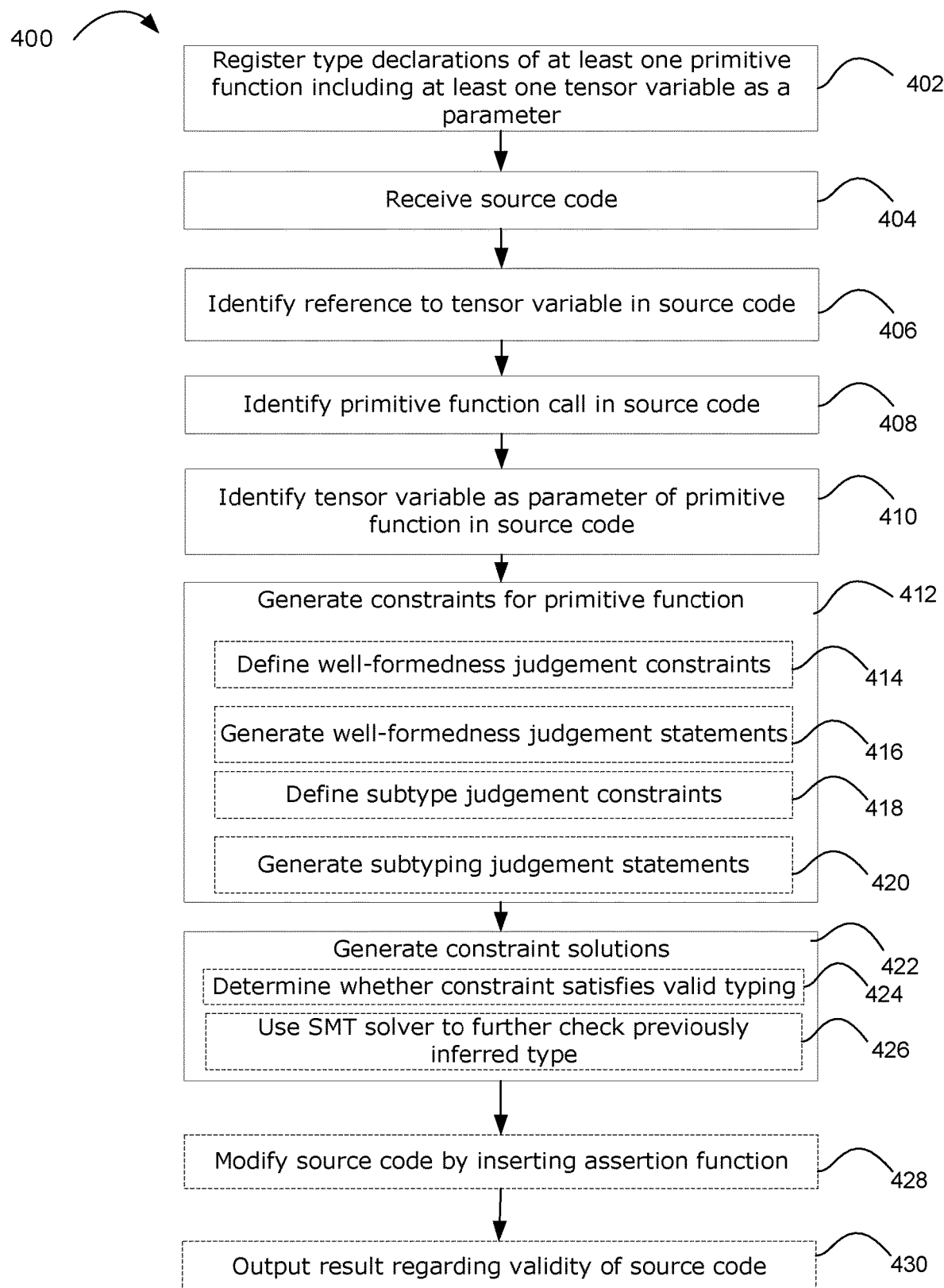
FIG. 4 illustrates a flowchart of a method for verifying and compiling source code that may be carried out by a software verification system, according to an example embodiment.

FIG. 4 shows an example method 400 of verifying and compiling source code that may be implemented by a verification system, such as a compiler, using a modified liquid type system in accordance with the present disclosure.

At 402, type declarations are registered for at least one primitive function. The primitive function may be any built-in function or predetermined function defined at the level of the programming language, such as add or multiply. In examples described herein, the primitive function is a matrix multiplication function matmul. The type declarations for the primitive function specify at least one tensor variable as a parameter to the primitive function. In the present examples, the primitive function matmul specifies two tensors as its input parameters, and the function returns a tensor as its output. It will be appreciated that matrix multiplication requires that the dimensions of the operands (i.e. the input parameters) satisfy certain criteria in order for matrix multiplication to be possible: for example, for two two-dimensional operand matrices, the width of the first operand must be equal to the height of the second operand. Thus, the tensors passed to the matmul function must have specific shape characteristics in order for the function call to be valid. Before continuing with the description of FIG. 4, a detailed example of type declarations for a primitive function will be described with reference to FIG. 5A.

FIG. 5A shows an example of registering a primitive function of the program 502. Prior to providing the source code to the compiler, primitive functions of the programming language are registered, and parameters of the primitive functions are defined, such that calls to those primitive functions and parameters of the primitive functions in the source code will be verified when the source code is compiled. In keeping with the current example, FIG. 5A shows the type declaration for the matmul primitive function.

In FIG. 5A, each parameter within matmul will be replaced by a respective tensor, for example, Tensor [(m, n), T]. Taking tensor [(m, n), T] as an example, m and n indicate this tensor is a two-dimensional tensor, m represents a value of rows of the two-dimensional tensor, and n represents a value of columns of the two-dimensional tensor. T indicates a type of constituents of the two-dimensional tensor.

Retuning to FIG. 4, at step 404, the source code is received. A detailed example of source code will be described with reference to FIG. 5B.

FIG. 5B presents an example of source code 502 that may be verified and compiled using the method 400 of FIG. 4. The source code 502 defines a function sampleFunction that takes two input parameters: a, an integer (type int), and b, also type int. The source code allocates a tensor t using the alloc function with the input parameters a and b. The source code 502 then calls primitive function matmul with input parameters t and t at line 502(1).

In the example of FIG. 5B, the matmul function called at line 502(1) is a primitive function. When the matmul function 502(1) is called in the source code 502, each parameter t within the matmul function 502 (1) will be replaced by a tensor that is declared in a type declaration with reference to FIG. 5A.

It will be appreciated that conventional type systems, such as HM type systems 102, may not be capable of verifying the source code 502, and in particular line 502(1), to determine that the matmul function is being invoked using input parameters (t,t) that render the function call invalid (because a 2 by 3 matrix cannot be multiplied by another 2 by 3 matrix). Some embodiments described herein may provide a solution to this problem by defining tensors using a liquid type system such that even a tensor with a shape and data type for its constituent elements defined at runtime may be verified as to its validity as a parameter within the source code.

At 406, a reference to a tensor variable in the source code is identified. In source code 502, for example, there are multiple references to tensor variable t.

At 408, a call to a primitive function in the source code is identified. In source code 502, the primitive function matmul is called at line 502(1).

At 410, the tensor variable invoked as a parameter of the primitive function in the source code is identified. In source code 502, tensor variable t is invoked as a parameter of the primitive function matmul at line 502(1). The type of the tensor variable (e.g., t) has several parameters: a shape parameter that specifies a plurality of dimensional sizes of the tensor variable (namely two dimensional sizes defined by integer parameters a and b); a plurality of components, the number of components corresponding to the product of the dimensional sizes (namely the uninitialized constituent components or elements of the a by b tensor defined by the alloc(a,b) function); and a type parameter that specifies a type for the components (namely the data type assigned to the constituent components of the tensor t by the alloc function).

At 412, the source code is traversed and inspected, generating at least one constraints for the primitive function. In some examples, the constraints may include well-formedness constraints (also known as well-formedness judgement statements) and subtyping constraints (also known as subtyping judgement statements). In the judgement statements, each tensor variable (e.g., tensor variable t) within the primitive function (e.g., matmul(t,t)) is represented by a first sized array of a sized array data type.

The sized array data type allows tensor variables of arbitrary shape to be further assessed using recursion. The sized array data type is defined by the liquid type system of the programming language such that a sized array of the sized array data type comprises one or more array elements, an associated type parameter that specifies a type for the array elements, and an associated size parameter that specifies a size of the sized array, the size corresponding to the number of array elements. What distinguishes the sized array data type from a standard one-dimensional array is that the type parameter may specify "sized array" as the data type for the elements of the sized array from a plurality of data types, enabling sized arrays to further assess tensors of arbitrary shape with elements of arbitrary data types using recursion.

A sized array may thus be represented in the format SArray[L,T], wherein L represents a length (i.e. size parameter) of the sized array, and T represents the type (i.e. type parameter) of the constituent elements contained within the sized array. A detailed example of a tensor representation by the liquid type system will be described with reference to FIG. 5C.

FIG. 5C shows how to use a tensor format as described herein to present a detailed example of a tensor 506. For example, the tensor 506 could be represented in the format Tensor[(2,3),int] wherein 2 indicates the number of rows of the tensor 506, 3 indicates the number of columns of the tensor 506, and int indicates that the constituent elements contained in the tensor 506 are of type int, i.e. integers (shown in FIG. 5C as integer value 5).

In an alternate example, the tensor type parameter is float (indicating a floating point number), and the constituents could be shown having float value 5.0. Using such a format to represent a tensor enables operators to acquire thorough information regarding the tensor (e.g., size, data type of constituent elements), which helps to ensure accuracy of outputs of the operators when the tensor is provided as input to the operators.

Taking the tensor 506 as an example, in order to allow the tensor format to be verified by the verification system, the tensor format Tensor[(2,3),int] can be recursively represented by a plurality of nested sized arrays with the format SArray[L,T] as follows: Tensor[(2,3),int]=SArray[2,SArray [3,int]]. This tensor corresponds to tensor t of FIG. 5B if a=2 and b=3.

This representation is constructed as follows. The first sized array (i.e. the base or top-level sized array corresponding to a base recursion level) is represented as a sized array of size 2, i.e. SArray[2,type], i.e. an array with two rows of an as-yet undefined type. A sized array SArray[3,int] is then used to represent each row of the tensor 506, such that the first sized array can be represented as SArray[2,SArray [3, int]], indicating a matrix with a first dimensional length of 2 (e.g., rows) and a second dimensional length of 3 (e.g., columns). Thus, the type parameter for the first sized array is SArray[3,int]. That is, [5 5 5] is one single constituent element of the first sized array.

In more general terms, the size of the first sized array (e.g., 2) corresponds to one of the dimensional sizes (e.g., integer a) of the tensor variable (e.g., tensor t). The associated type parameter of the first sized array is a sized array type (e.g., SArray[3,int]). The array elements of the first sized array are a first recursively nested set of sized arrays (e.g. instances of type SArray[3,int]), such that the size of the first sized array (e.g., 2) and the sizes of each recursively nested set of sized arrays within the first sized array (e.g., 3) collectively correspond to the dimensional sizes of the tensor variable (e.g., 2 by 3). The constraint further specifies that the first sized array (e.g., t=SArray[2,SArray [3, int]]) is input to the primitive function (e.g., matmul) to invoke the primitive function.

In some examples, the number of sized arrays used to recursively represent a tensor depends on the number of size elements included in the tensor. For example, if there is one single size element included in the tensor, only one sized array is used to represent the tensor.

Returning to FIG. 4, constraint generation at step 412 may involve one or more optional steps (optional steps being shown in FIG. 4 in dashed lines). In some embodiments, well-formedness judgement constraints may be defined at step 414 to allow the generation of well-formedness judgement statements at step 416, and/or subtyping judgement constraints may be defined at step 418 to allow the generation of subtyping judgement statements at step 420, thereby representing each tensor as a plurality of recursively nested sized arrays, which will be discussed in greater detail below with reference to FIGS. 6A through 7B. Well-formedness judgment constraints and subtyping judgement constraints may enable the liquid type system to define the tensor, as represented by the sized array type format, to be verified and compiled by the verification system with greater accuracy.

At 422, constraint solutions are generated, based on the constraints generated at step 412, to verify (i.e., determine the validity of) the source code. In some examples, generating constraint solution may include one or more optional sub-steps. In some embodiments, at optional step 424, an inferred valid typing is used to determine whether the generated constraints satisfy the inferred valid typing. At optional step 426, an SMT solver may be used in a fixed point algorithm to infer a valid type. The inferred value type is generated and is one of the general types that satisfy the constraints. Steps 424 and 426 may be iterated, with each of the two steps feeding back to the other.

At further optional step 428, in response to determining that the source code is not valid (e.g. at step 422 or 426), the source code may be modified by inserting an assertion function as a fall-back strategy.

At further optional step 430, the verification system outputs a result with respect to the validity of the source code. For example, if the generated constraints are satisfiable, the verification system may output a "safe" or "valid" signifier, meaning that the source code 502 has been successfully verified. If the generated constraints are not satisfiable, the verification system may output an "unsafe" or "invalid" signifier, along with a report for the developer identifying type errors at positions where the invalid constraints are created. This report may enable the developer to debug errors in the source code 502.

Thus, in some embodiments, tensors with dynamic shape information (e.g., dynamic number of dimensions, size of each dimension, and data type of constituent elements) may be provided as input to operators of a program, such as a neural network used as a natural language processing model. The tensors may be represented as parameters of primitive functions, with the tensors' shape information providing thorough information for verifying the source code of the program. Furthermore, specific constraints may be generated with respect to the tensors such that the verification system can compile the tensors provided as parameters to the primitive function, enabling validity result to be generated with greater reliability and accuracy. In addition, the efficiency of source code debugging may be boosted significantly.

In some embodiments described above, no type defining the tensor format Tensor[(m,n),type] may yet be recognizable by the verification system. It may be challenging to compile and invoke primitive functions wherein the tensor format Tensor[(m,n),type] is used. Therefore, when the constraints are generated, such as at step 412 of method 400, a plurality of well-formedness judgement constraints may be generated at step 414, and a plurality of subtyping judgement constraints may be generated at step 418. The well-formedness judgement constraints and subtyping judgement constraints may be specifically defined for the defined tensor format Tensor[(m,n),type] in order to enable the tensor defined by size elements (m,n) and contained type type to be compiled in the verification system. An example of defining a plurality of well-formedness judgement constraints and plurality of subtyping judgement constraints for the defined tensor format Tensor[(m,n),type] will be described in greater detail with reference to FIGS. 6A through 7B.

Figure 6A:
FIG. 6A shows well-formedness judgement constraints defined by the method of FIG. 4.

FIG. 6A shows a general syntax, constituting a well-formedness judgement constraint 602, for a sized array that is used to represent a tensor. The constraint 602 states that a dependent type of j (e.g., j is a tensor) is well-formed, and j's type is defined by a sized array SArray[i,T]. Thus, the tensor j is a one-dimensional array, and a single sized array SArray[i,T] is used to define the tensor j. To represent a multi-dimensional tensor, such as two-dimensional tensor Tensor[(2,3),int]), the syntax will be defined with reference to FIG. 6B.

Figure 6B:
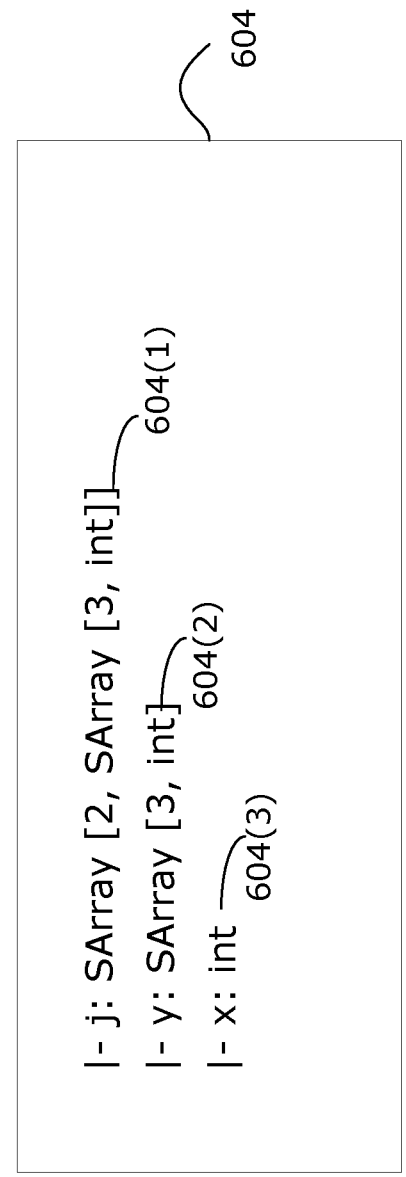
FIG. 6B shows further well-formedness judgement constraints defined by the method of FIG. 4.

FIG. 6B shows a syntax wherein two sized arrays are used to represent the tensor Tensor[(2,3),int]. A well-formedness judgement constraint 604 includes first, second, and third clauses 604(1)-(3). First clause 604(1) states that a dependent type of j (e.g., j is type Tensor[(2,3),int]) is well-formed, and j's type is defined by a sized array SArray[2, SArray[3,int]].

Clause 604(2) states that a dependent type of y is well-formed and y's type is defined by a sized array SArray[3, int]. As a type of the sized array SArray[3,int] is not yet recognizable by the verification system, the sized array SArray[3,int] has to be further assessed using recursion until a type int in clause 604(3) can be recognized by the verification system.

Thus, a constraint may include one or more well-formedness judgement constraints (e.g., 604) that state a type of the first sized array (e.g., j=SArray[2,SArray[3,int]]). Well-formedness judgement statements are generated based on the plurality of defined well-formedness judgement constraints until an associated type parameter of a recursively nested sized array (e.g., type parameter int of y=SArray[3, int]) of the first sized array (e.g., j) corresponds to the type parameter of the tensor variable (e.g. the type parameter of tensor variable Tensor[(2,3),int], i.e. x=int).

Therefore, in order to ensure each tensor can be compiled by the verification system, the plurality of well-formedness judgement constraints are defined to use a plurality of sized arrays to recursively represent a tensor or a dependent type of the tensor until a type (e.g., int) used to represent the elements of tensor can be recognized by the verification system.

The defined well-formedness judgement constraints, such as well-formedness judgement constraints 602 or 604, enable well-formedness constraints (also known as well-formedness judgements or well-formedness judgement statements) regarding the tensors invoked by the source code 502 to be generated (e.g., at step 416 of method 400) in a manner that the verification system can recognize. This may help to improve the accuracy of verification of sources code 502 and allow tensors defined with shape information to be verified at compile time when invoked in source code 502.

Figure 7A:
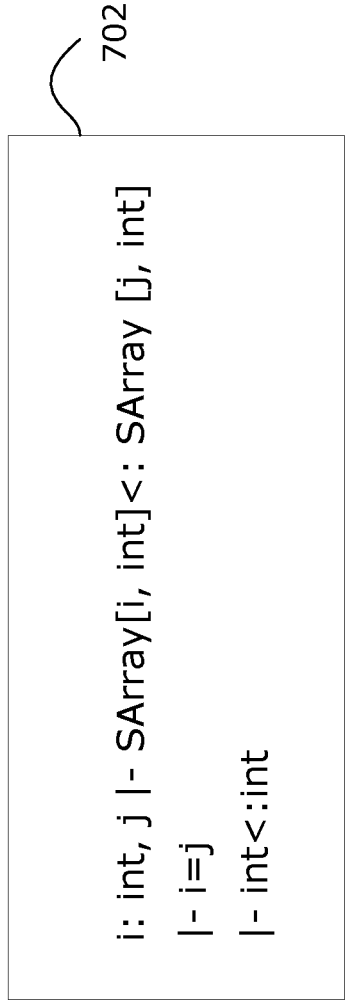
FIGS. 7A and 7B show subtyping judgement constraints defined by the method of FIG. 4.
Figure 7B:
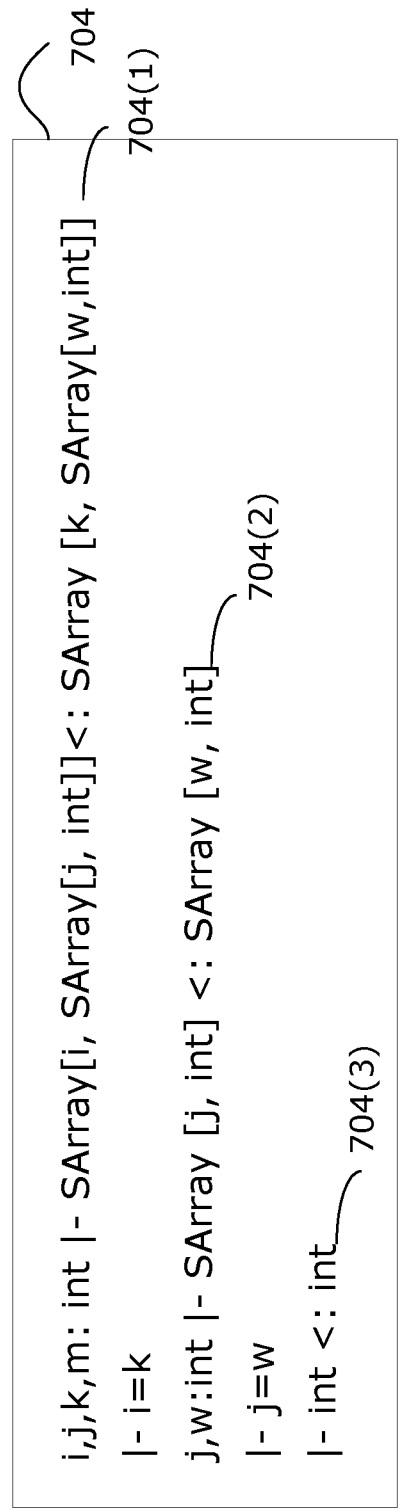

FIGS. 7A and 7B illustrate an example of defining subtyping judgement constraints in accordance with example embodiments, which may be implemented at step 418 of method 400.

FIG. 7A presents subtyping judgement constraints 702 for a one-dimensional tensor. For example, if the one-dimensional tensor is represented by a sized array SArray[i,T], subtyping judgement constraints 702 define that a dependent type of the sized array SArray[i] is a subtype of a sized array SArray[j,int]. In some examples, the sized array SArray[j, int] may be a result that is generated from another program or stored from another program.

FIG. 7B demonstrates subtyping judgement constraints 704 for a two-dimensional tensor. The two-dimensional tensor is shown as being represented by a sized array SArray[i,SArray[j,int]] (e.g., SArray[2,SArray[3,int]]). The subtyping judgement constraints 704 define how to recursively construct the sized array SArray[i,SArray[j,int]] until a type within a final sized array can be recognized by the verification system.

Clause 704 (1) states that a dependent type of the sized array SArray[i,SArray[j,int]] is a subtype of a SArray[k,SArray[w,int]. As a type with the SArray[k,SArray[w,int] is not yet recognizable by the verification system, SArray[k,SArray[w,int] has to be further defined.

Clause 704 (2) states that a dependent type of a sized array SArray[i,SArray[j,int]] is a subtype of a SArray[w,int]. As a type with the type parameter SArray[w,int] is not yet recognizable by the verification system, SArray[w,int] has to be further defined.

Clause 704 (3) states that a dependent type of int is a subtype of a type int. The constraints 704 do not stop assessing nested sized arrays using recursion until the type int of a final sized array can be recognised by the verification system.

The defined subtyping judgement constraints (e.g., 704) enable subtyping constraints (also known as subtyping judgements or subtyping judgement statements) regarding the tensors applied in the source code 502 to be generated accurately (e.g., at step 420 of method 400), leading the tensors defined with shape information to be accepted and recognized by the verification system. The reliability of the validity result of source code may be increased accordingly.

In some examples, the well-formedness judgement constraints and the subtyping judgement constraints are defined to collectively improve the accuracy and reliability of validity results of verification of source code.

Once the well-formedness judgement constraints and the subtyping judgement constraints are defined, each statement of the source code will be converted to one or more well-formedness judgement statements (at step 416) and one or more subtyping judgement statements (at step 420) during step 412 of constraints generation, based on the defined constraints.

Figure 8:
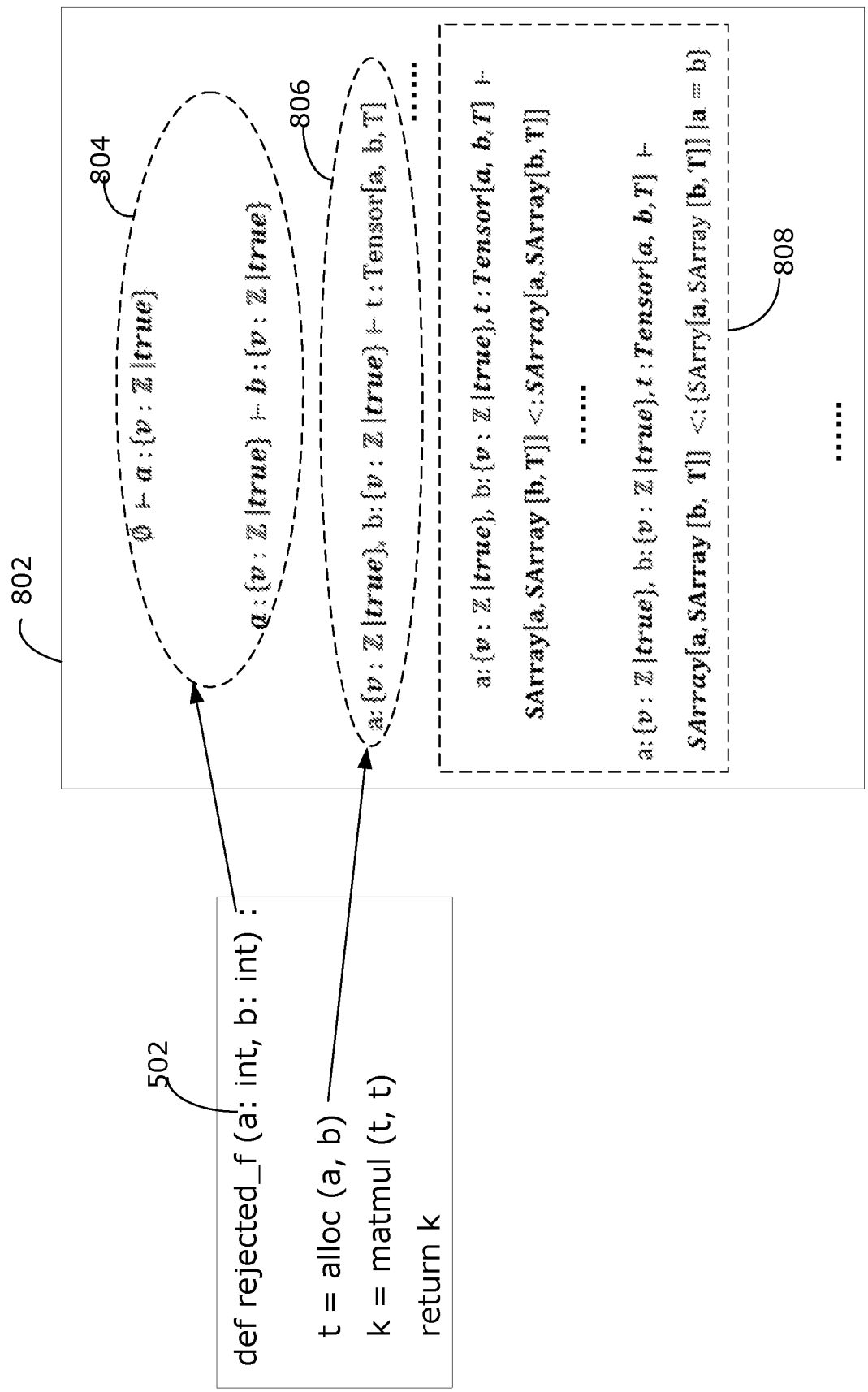
FIG. 8 illustrates an example of generating constraints based on the source code of the computer program of FIG. 5B.

FIG. 8 illustrates an example of converting the source code 502 into constraints 802, including well-formedness judgements and subtyping judgements, at step 412 and its sub-steps 414-420, in accordance with an example embodiment.

The constraints 802 include statements 804, 806, and 808. Statements 804 are well-formedness judgement statements that define parameters a and b.

Statement 806 is a well-formedness judgement statement that defines t, which is assigned a tensor Tensor[(a,b),T]. Type parameter T may be int or float or any other suitable type.

Statements 808 are subtyping judgement statements that use sized arrays to further assess the tensor Tensor[(a,b),T] using recursion.

In some examples, well-formedness judgement statements are generated when new parameters are assigned values, whereas subtyping judgement statements are generated when primitive functions are called or invoked.

In some examples, with respect to the sized array with a format SArray[L,T] as described above, a dependent pair is now described to define the length of SArray[L,T] with reference to FIG. 9.

FIG. 9 shows an example of a dependent pair 902 including a first component 902(1) and second component 902(2). A type of the length L is defined by a type of a second component 902(2) of a dependent pair 902, which depends on a value defined by a first component 902(1) of the dependent pair 902. As shown in FIG. 9, the first component 902(1) defines a range of natural numbers greater than 5. Thus, the type of the length L is defined as a type of natural number greater than 5. Such a dependent pair used in constraint generation, such as step 412 of method 400, may help to acquire the data type of the length of the sized array with greater accuracy, which may in turn help to improve the flexibility of the tensor representation.

When primitive functions invoke tensors as parameters in source code, the types of each size element of the tensor may have to be defined each time. Thus, a lot of redundant coding and excessive storage space may be needed to define types of each size element of a tensor each time the tensor is invoked.

FIG. 10 shows an example of registering types of each size element of a tensor as implicit parameters, which may help to improve the efficiency of code and save storage space. For example, when the type declarations of the primitive function matmul 1002 are registered, brackets "{ }" are used to register types of each size element of the tensor parameters as implicit parameters. In the example of FIG. 10, the types of the size elements are implicitly defined as natural numbers. In such a case, when a primitive function invoking one or more tensors is identified in source code, there is no need to define the types of each size element of the one or more tensors each time the tensors are invoked by the primitive function. Accordingly, computation cost and storage space may be reduced.

With respect to generating constraint solutions (e.g., at step 422), the SMT solver may determine whether source code (e.g., source code 502) is valid or invalid. In some examples, if the SMT solver determines that the validity of the source code 502 is uncertain, the verification system may enter a relax mode which enables source code 502 to be modified. This may help to double check the validity of the source code 502.

FIG. 11 presents an example of adding an assert clause 1104 (e.g., an assert function) into the source code 502 to generate modified source code 1102. The modified source code 1102 may help to improve the accuracy of validity results generated by the verification system. In some examples, it is difficult for the SMT solver to perform complicated computations, such as quadratic equations. When the SMT solver encounters such computationally intensive problems, the verification system may output that the validity of the source code 502 is uncertain. For example, the verification system in some embodiments may be unable to calculate an equation $v=(x*(x-1))/2$. Thus, the SMT solver may fail to check a type of a function using that equation. An assert clause or function 1104 may therefore be inserted for validity checking. The assert function 1104 checks a value of an expression that is expected to be true. If the expression is evaluated to be false, an error message may be displayed, or a signifier of failed verification as described above may be generated.

As shown in FIG. 11, in order to confirm whether a value of ret equals $x*(x-1)/2$, an assert function 1104 stating "assert (ret==(x*(x-1)/2)" is added to the modified source code 1102, which may help to verify whether ret equals $x*(x-1)/2$. Adding an assert function into the source code 502 may help to provide a relax mode when the program is debugged, and may be applicable when tensors are used. Such a relax mode may enable the accuracy of the validity result to be increased.

Figure 12:
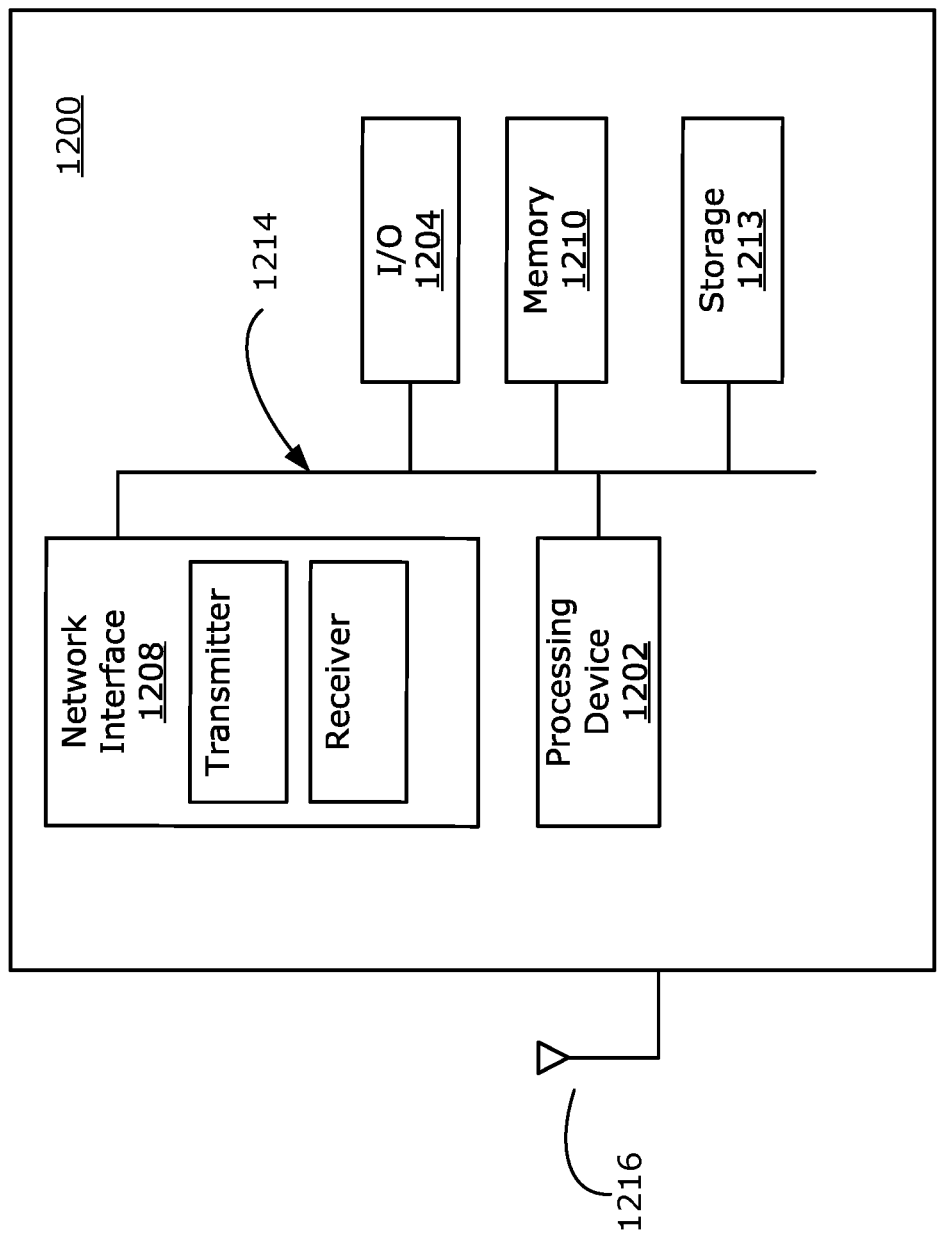
FIG. 12 is a block diagram illustrating a processing system which may carry out the methods of FIGS. 3 and 4, according to example embodiments.

FIG. 12 illustrates an example processing system 1200 which may be used to implement methods and systems described herein, such as the verification system implementing method 300 and/or method 400. Other processing systems suitable for implementing the methods and systems described in the present disclosure may be used, which may include components different from those discussed below. Although FIG. 12 shows a single instance of each component, there may be multiple instances of each component in the processing system 1200.

The processing system 1200 may include one or more processing devices 1202, such as a processor, a microprocessor, an application-specific integrated circuit (ASIC), a field-programmable gate array (FPGA), a dedicated logic circuitry, or combinations thereof. The processing system 1200 may also include one or more input/output (I/O) interfaces 1214, which may enable interfacing with one or more appropriate input devices and/or output devices (not shown). One or more of the input devices and/or output devices may be included as a component of the processing system 1200 or may be external to the processing system 1200. The processing system 1200 may include one or more network interfaces 1208 for wired or wireless communication with a network. In example embodiments, network interfaces 1208 include one or more wireless interfaces such as transmitters that enable communications in a network. The network interface(s) 1208 may include interfaces for wired links (e.g., Ethernet cable) and/or wireless links (e.g., one or more radio frequency links) for intra-network and/or inter-network communications. The network interface(s) 1208 may provide wireless communication via one or more transmitters or transmitting antennas, one or more receivers or receiving antennas, and various signal processing hardware and software. In this regard, some network interface(s) 1208 may include respective processing systems that are similar to processing system 1200. In this example, a single antenna 1216 is shown, which may serve as both transmitting and receiving antenna. However, in other examples there may be separate antennas for transmitting and receiving.

The processing system 1200 may also include one or more storage units 1213, which may include a mass storage unit such as a solid state drive, a hard disk drive, a magnetic disk drive and/or an optical disk drive. The processing system 1200 may include one or more memories 1210, which may include a volatile or non-volatile memory (e.g., a flash memory, a random access memory (RAM), and/or a read-only memory (ROM)). The non-transitory memory(ies) 1210 may store instructions for execution by the processing device(s) 1202, such as to carry out the present disclosure. The memory(ies) 1210 may include other software instructions, such as for implementing an operating system and other applications/functions. In some examples, one or more data sets and/or module(s) may be provided by an external memory (e.g., an external drive in wired or wireless communication with the processing system 1200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 1214 providing communication among components of the processing system 1200, including the processing device(s) 1202, I/O interface(s) 1204, network interface(s) 1208, storage unit(s) 1213, memory (ies) 1210. The bus 1214 may be any suitable bus architecture including, for example, a memory bus, a peripheral bus or a video bus.

In some examples, the processing system 1200 may be used to perform methods 300 or 400 as discussed in reference to FIGS. 3 and 4. For example, the processing system 1200 may register the primitive function 504 wherein tensors with a format Tensor[(a,b),T] described above are applied. The processing system 1200 may receive and compile the source code 502 as described in FIG. 5B. In some other examples, the processing system 1200 may define well-formedness judgement constraints and subtyping judgement constraints as illustrated in FIGS. 6A-6B and 7A-7B for the format Tensor[(a,b),T], in order to enable the tensors with format Tensor[(a,b),T] to be recognized and compiled by the processing system 1200. Based on the defined constraints, the processing system 1200 may convert the source code 502 into constraints 802 as shown in FIG. 8. As such, the processing system 1200 can recognize tensors in primitive functions and check the validity of the source code 502, including the tensors, precisely.

In some applications, the processing system 1200 may use a dependent pair 902 as shown in FIG. 9 to define a type of a length of a sized array, which may help to improve the accuracy of defining the type of the length of the sized array. In some embodiments, the processing system 1200 may implicitly define types of size elements used to define tensors when registering primitive functions where the tensors are applied, which may help reduce storage cost significantly when the processing system passes the size elements into the primitive functions. In some example, if the processing system 1200 outputs a determination that the validity of a program is uncertain, the processing system 1200 may add an assert function into the program and generate constraints solutions again, which may help to double check the uncertain result regarding the validity of the program, which may in turn enable a result regarding validity to be generated with greater accuracy and may enable debugging to be performed more efficiently.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for verifying source code of a computer program written in a programming language, the method comprising:
  receiving the source code;
  identifying a reference to a tensor variable in the source code;
  compiling the source code to generate a constraint, the constraint specifying that:
    the tensor variable is represented by a first sized array of a sized array data type, the sized array data type being defined by the programming language such that a sized array of the sized array data type comprises:
      a first number of array elements, the first number being one or more;
      an associated type parameter that specifies a type for the array elements, the type parameter being selected from of a plurality of types, the plurality of types including the sized array data type; and
      an associated size parameter that specifies a size of the sized array, the size corresponding to the first number; and
  generating one or more constraint solutions based on the constraint to verify the source code by:
    using a satisfiability modulo theories (SMT) solver to infer a valid typing for the source code; and
    determining whether the generated constraint satisfies the inferred valid typing.

2. The method of claim 1, further comprising:
  identifying a call to a primitive function in the source code; and
  identifying the tensor variable invoked as a parameter of the primitive function in the source code;
  wherein:
    the tensor variable is specified by the source code to include:
      a shape parameter that specifies a plurality of dimensional sizes of the tensor variable;
      a plurality of components, the number of components corresponding to the product of the dimensional sizes; and
      a type parameter that specifies a type for the components; and
    the size of the first sized array corresponds to one of the dimensional sizes of the tensor variable;
    the associated type parameter of the first sized array is a sized array type;
    the array elements of the first sized array are a first recursively nested set of sized arrays, such that the size of the first sized array and the sizes of each recursively nested set of sized arrays within the first sized array collectively correspond to the dimensional sizes of the tensor variable; and
    the constraint further specifies that the first sized array is input to the primitive function to invoke the primitive function.

3. The method of claim 2, wherein:
  the constraint includes one or more well-formedness judgement statements; and
  generating the constraint further comprises:
    defining a plurality of well-formedness judgement constraints that state a type of the first sized array; and
    generating the well-formedness judgement statements based on the plurality of defined well-formedness judgement constraints until an associated type parameter of a recursively nested sized array of the first sized array corresponds to the type parameter of the tensor variable.

4. The method of claim 2, wherein:
  the constraint includes one or more subtyping judgement statements; and
  generating the constraint for the input tensor further comprises:
    defining a plurality of subtype judgement constraints that state a type of the first sized array, the type of the first sized array being a subtype of a predefined sized array format, the predefined sized array format comprising a sized array having a predefined type parameter value and a predefined size parameter value for itself and each of its recursively nested sized arrays; and
    generating the subtyping judgements based on the plurality of defined subtype judgement constraints until an associated type parameter of a recursively nested sized array of the first sized array corresponds to the type parameter of the tensor variable.

5. The method of claim 2, wherein:
  the programming language defines a dependent pair type, a dependent pair of the dependent pair type comprising:
    a first component having a value; and
    a second component having a type, the type being based on the value of the first component; and
  the value of the shape parameter of the tensor variable is defined by a second component type of a dependent pair.

6. The method of claim 2, the method further comprising:
  registering the primitive function and the tensor variable by representing the dimensional sizes of the tensor variable as implicit parameters.

7. The method of claim 1, the method further comprising, in response to determining that the source code is uncertain as a result of verification:
  modifying the source code by inserting an assertion function into the source code to automatically verify the modified source code during runtime.

8. The method of claim 1, the method further comprising:
  outputting a result with respect to a verified validity of the program source code.

9. A non-transitory computer-readable medium having instructions tangibly stored thereon, wherein the instructions, when executed by a processing unit, causes the processing unit to perform the method of claim 1.

10. A non-transitory computer-readable medium having instructions tangibly stored thereon, wherein the instructions, when executed by a processing unit, causes the processing unit to perform the method of claim 2.

* * * * *